July 26, 1960 S. LOEWE 2,946,127

MAGNETIC TAPE INDEXING

Filed Jan. 17, 1955

Jnventor:

Siegmund Loewe 2,946,127

MAGNETIC TAPE INDEXING

Siegmund Loewe, 68 Ridge Road, Yonkers 5, N.Y.

Filed Jan. 17, 1955, Ser. No. 482,063

4 Claims. (Cl. 33—128)

Figure 1:
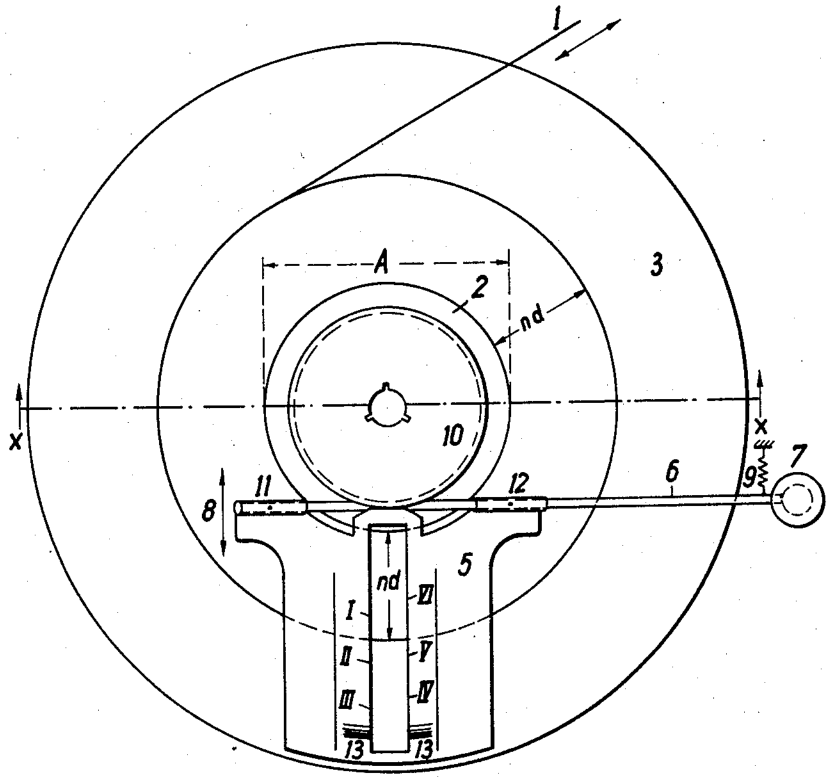

The present invention relates to the indexing of recordings on magnetic tape, a problem that must find a simple and efficient solution if tape recordings are ever to compete successfully with disc recordings. It must be made possible to locate, without undue exertion or inaccuracy, any desired part of an extended recording. It may seem that any recorder equipped with a device for counting the number of turns of the reel on which the tape is wound should fulfill the above condition and indeed, in a limited way, it does. However, just that limitation, not noticeable when counting of turns is done from a known starting point on, for instance from zero on, becomes a severe drawback if the starting point is unknown.

In that case, the reel must be turned forth or back until a known starting point is reached. It is general practice to completely rewind the reel and to reset the turn-meter to zero, a time-consuming and undesirable procedure necessary for the sole purpose of giving the readings of the turn-meter a definite relation to the location of the recordings on the tape, which means for the purpose of indexing. It is the object of this invention to minimize or overcome this drawback.

From the foregoing it becomes clear that one way of obtaining the object of the invention, which is indexing without the need for rewind, consists in providing markings on the tape which tell at each turn how many turns it is away from zero thus eliminating the necessity for rewind. As is known, such markings may be printed on the tape or recorded on it. In this case the markings indicate fast-wind time, while according to the present invention, markings which indicate turn-numbers are proposed. Using a numbers table which at a glance gives the necessary number of revolutions from the location indicated by the marking to the desired new location on the tape and furthermore using a revolution-meter which can be quickly set to zero the unnecessary time loss can be reduced to a minimum.

Counting the actual number of turns from zero to a desired location on the tape appears to be the most accurate indexing method which indeed it is on one condition: that the final number of turns is reached with sufficiently low speed to stop the mechanism exactly at the correct number of turns. In order to do this one has to slow down from the fast-wind speed repeatedly in order to read the meter, which moves at fast-wind speed far too fast to be properly read. So once more unnecessary time is lost and undesirable effort required. On the other hand, if one has not the patience to slow down in time the likely result is that one under- or overshoots the correct number of turns and in correcting the mistake loses still more time. Careful comparison of obtainable results with different ways of indexing conforming to the object of the present invention, which is simple, fast and accurate location of any desired part of an extended recording without need for any rewind, has shown that completely satisfactory practical results will be obtained in the following way:

Experiments have shown that a certain number of turns ($n$) of a tape the thickness of which is ($d$) wound on a core of a reel with diameter (A) will form on the core A a layer of tape of the thickness $nd$, provided the tape is wound up under sufficient tension. Therefore, next to $n$ the product $nd$ serves best to identify a certain location on the tape. Interestingly, it is not necessary to know $n$ or $d$ themselves as long as the product $nd$ is known. Consequently, if the indexing is done on the basis of $nd$, any measuring of revolutions can be dispensed with. The product $nd$ is a length which for a 7 inch reel varies between zero and about 6 cm. The number of turns $n$ may with modern thin tape come up to 2000. The innermost turn nearest the core A will have a tape-length of about 20 cm. equal to 2 play seconds at low speed, the outermost turn a tape-length of about 50 cm. equal to about 5 play-seconds. These figures show how much an error in turns means in seconds if one over- or undershoots the correct number of turns for a desired spot on the tape. As mentioned above even by closely watching a turn-meter counting the revolutions of the reel one will, at fast speeds of winding, easily overshoot by 10 turns or 50 play seconds, if the desired spot is near the outer end of the tape.

It may be mentioned that for the purpose of explaining the nature of the present invention a driving mechanism of the recorder or reproducer (which turns the reel) is assumed which permits a suden dead stop of the reel even at fast wind or rewind speed. Modern recorders are equipped with stopping mechanisms which justify such assumption. If the stopping mechanism is actuated electrically, for instance by a strip of conducting material attached to the tape at places where a stop might be desirable and closing by passing over contact points the electric circuit actuating the stopping mechanism, then a high degree of stopping accuracy is obtainable and the stopping can be made to work completely automatic. However if one wants to be able to pick out at one's own choice the stopping points such automatic device does not serve well. The practical requirement which to fulfill is the primary object of the present invention can be formulated as follows:

"A reel of magnetic tape carries various recordings. I want to be able to tell at all times not only What is recorded on the reel but exactly Where. I want to hear something special also, the location of which I want to be able to mark so as to find it again whenever I care to, Fast and Without Fail."

As stated above this requirement is to be fulfilled without recourse to counting the turns by a turn-counter which would necessitate a rewind to a known starting point for the turn-counting.

According to the invention the length of the product $nd$ is used to solve the problem. The surprising fact is, that by systematic elimination of all sources of error in measuring that length a degree of accuracy is obtainable that makes the method practical, in some respects almost ideal.

It may be pointed out here that without leaving the scope of this invention the length $nd$ may be measured by measuring a length $nd+c$, wherein $c$ means a constant which may or may not be known as long as $c$ is actually constant within the accuracy required for the measurement of $nd$. This required accuracy is very high. If for instance one wants to stop at turn number one thousand the required accuracy would be one tenth of 1% of $nd$ and even higher of $nd+c$. It is for this reason that all prior efforts of indexing on the basis of measuring a length, for instance the diameter (or radius) of the circle formed by the tape wound on the core of the reel up to the point to be measured, have met with only limited success. In principle, it is desirable and one of the main points of the present invention to measure the length $nd$ itself thus eliminating all factors not essential for the indexing purpose. Second choice would be to measure $2nd+A$, which is also satisfactory as long as the tape to be indexed remains on the same reel with the core-diameter A which herein is generally assumed to be the case. However, here applies that while A may remain unknown it must be constant, in other words the core must be a perfect circle with an accuracy at least equal to that required for the measurement of $nd$. Instead of A itself any fraction or multiple of it can be used.

Third choice would be to measure $nd+A/2$ meaning the radial distance from the center of the reel to the circumference formed by the $n$ turns of tape wound on the core with diameter A. Experiments have shown that satisfactory indexing can also be based on $nd+A/2$ provided that in addition to the rules given herein for the first two choices one more rule is carefully observed: not only must A be a perfect circle of the required accuracy but—with the same degree of accuracy—must the center of that perfect circle coincide with the axis turning the reel and again with at least the same degree of accuracy must that coincidence be maintained in rotation. Otherwise the reel will wobble, horizontally, vertically or both and correspondingly reduce the accuracy of the indexing. Well built recorders and reels, provided the reels fit the axis without noticeable play are—in addition to the general rules for the first two choices—a specific necessity for the $nd+A/2$ method. It is one of the significant advantages offered by the present invention that, while well built recorders and reels will always contribute to good results, they are by no means a condition for the first two choices, which, as will be explained, can cope with any kind of wobble without impairing the accuracy of the measurement. There is however a slight difference also between methods one and two. While method one—measuring $nd$ directly—makes the indexing free from any other factors or considerations to be observed, for instance the core A does not have to be round or centered, method two requires the core A to be exactly round at least with the same accuracy as desired for the indexing, although in contrast to method 3 it does not need to be exactly centered.

The above stated conditions would have to be formulated somewhat differently if the indexing would not be required, as it is in practice, to be valid while the reel with the variable number $n$ of turns of tape on its core is rotating, but the relative merits of the three methods would essentially remain the same.

It may now be explained what new principle has been developed and forms part of this invention: it is a moving or movable indicator of the indexing device instead of a fixed or stationary one as was used heretofore. Specifically, if the indicator is made movable in such a way as to follow accurately any wobble or eccentricity of the reel both at slow and fast speeds then the main source of error and inaccuracy can be completely eliminated. A very simple indexing system results that, as many experiments have shown, permits one without fail to stop the tape in full rewind speed within a few play-seconds from the designated spot and often almost at the same bar. The reason for the enormously increased accuracy is to be found in the ease and effortlessness with which after eliminating the wobble the changing length of $nd$ can either be observed in its now steady approach to the index-mark or can be made to actuate a mechanical index or switch as will be explained later on.

The invention is also based on an important observation: it would be a mistake to assume that under all circumstances the length $nd$ must always be the same for the same designated spot on the tape. Certain safeguards have to be observed, one of which, the necessity to keep the tension of the tape within certain limits, has already been mentioned. But it is furthermore necessary to eliminate—within those limits—all sudden, especially rhythmic changes of tension and most important: changes which happen regularly at every turn. Under the influence of such changes the tape will be alternately stretched and released with corresponding changes of length and thickness thereby changing $n$ and $d$ and the product $nd$. It has been observed and confirmed by measuring that the length $nd$, which is the thickness of $n$ turns of tape on the core A will, under these proper safeguards, always be the same even if the core A is not adequately round or centered.

A movable indicator, moving in conformity with any undesired or unavoidable vacillation of the length to be measured (vacillating of course as a whole while slowly in- or decreasing) can according to a further object of the invention be made movable in a horizontal as well as in a vertical direction so as to be able to follow all kinds of wobble. According to the further invention the movable indicator can be made so light and easily movable that it can be put in direct contact with the layer of tape on the reel without damaging it in any way. It can even be kept in steady contact with the tape during fast rewind and also is desired at normal speed while recording or replaying without any noticeable effect on wow or flutter.

Development of an accurate indexing system without need for rewind to a known starting point according to the present invention makes it singularly suitable for use in connection with magazines or cartridges in which the reels of tape are held for easier handling. One of the great advantages of such magazines as against the use of loose reels is that the magazine can be removed from the recorder without need to rewind first. Now this can be done without the slightest loss of definition or validity of the movable indicator which can be made simple and cheap enough to be built into each magazine. If desired, the indexing can be done in numbers of turns telling the user at a glance at what point he is and how many turns he has to go to any other spot on the tape. Experiments have shown this kind of indexing to be precise within better than one percent of the actual number of turns measured with a revolution-counter.

For the purposes of the present invention (and also part of it) is of great advantage a specially designed reel with a removed or removable upper flange and a cylindrical core consisting of two parts: the lower conventional part on which the tape is wound and above it an also cylindrical part of smaller, larger or the same diameter serving as guide for the movable indicator. There is only one essential condition this guide-part has to fulfill: its contour must be exactly centered to that on which the tape is wound. In its simplest form this guide part consists in an extension of the cylinder on which the tape is wound. Measuring of $nd$ is done from this guide part as basis. Obviously, if the reel and with it the core with the tape on it wobbles in rotation the guide-part will participate on that motion and will cause the movable indicator also to participate. There will be only one relative movement left: that of the changing length of $nd$ against the index-mark on the indicator.

Figure 2:
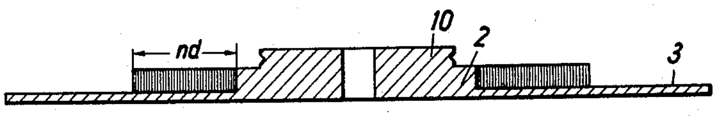

An exemplary embodiment of the invention is shown in the accompanying drawing, wherein Fig. 1 shows a view from above of the tape reel with the index in accordance with the invention and Fig. 2 represents the cross-section of this tape reel on the line $x—x$ of Fig. 1.

In these figures the tape 1 of the thickness $d$ is wound in $n$ turns on the core 2 of diameter A forming a layer of tape of the length $nd$ on the core 2. The reel 3 the upper flange of which is removed is turned in the usual way by the recorder mechanism fast or slow, clockwise or counterclockwise. Thereby the tape 1 will be wound or unwound, the number of turns $n$ will change and accordingly the length *nd*. This change of length of *nd* is observed through the window 4 in the indicator 5. The indicator 5 carries markings, six of which are shown as an example and marked I to VI. Whenever the length *nd* reaches one of these marks a point of special interest on the tape is reached and just about passing the recording or replaying head of the recorder. If the movement of the tape is stopped at the proper moment when *nd* is about exactly level with an index-mark on the indicator 5 then the respective point of interest on the tape will unfailingly be near at hand. Watching the approach of *nd* to the index mark through a magnifying glass or by episcopic projection in enlarged scale increases both the ease and accuracy of the procedure.

It may now be described how the indicator 5 is made movable in order to eliminate undesirable relative movements of *nd* against the index-marks. The indicator 5 is carried by a holder 6, for instance a round rod of metal, wood or plastic mounted on a preferably turnable support 7 so as to permit free movement as indicated by the arrow 8. A spring 9 holds the rod 6 continuously in contact with the guide-part 10 of the core 2. Whatever wobbling movement the core 2 may make the rod 6 and with it the indicator 5 will exactly follow. This holds true also for vertical wobbling movements of the core 2 or the flange 3 if the holder 6 is made somewhat flexible or elastic or the support 7 permits the holder 6 some vertical play. In practice it will be found that the layer of tape wound on the core 2 wobbles vertically against core and flange. This source of error can also be eliminated by hinging the indicator on the holder 6. Such hinges are indicated in Fig. 1 at 11 and 12 as sleeves reaching around the rod 6, secured against movement to the right or left by little pits (indicated by small circles on the sleeves) snapping into corresponding circular grooves in rod 6 thus permitting the indicator to follow any kind of wobbling movements the tape may make. The indicator 5 may be made from metal foil, thin stiff paper or suitable plastic material and may carry the index-marks directly or on a special part removable from the indicator itself. If the marking is to be done by the user himself it was found practical to provide fine grooves embossed on the indicator which facilitate the application of markings. Such grooves, concentric circles equivalent to the layers of tape, are indicated in Fig. 1 at both sides of the window 4 at 13. They guide the sharp point of the pencil easily exactly at the place where a mark is to be made and also materially facilitate, by guiding the eye to the correct point to stop even at fast speeds of rewind, the obtaining of satisfying results.

The support 7 may be attached to the recorder chassis or to the magazine. In the latter case the whole indexing device remains at all times with the magazine maintaining even when the magazine is removed from the recorder complete control about what is recorded on the particular tape and where.

In practice the whole indexing device can be made of one piece, preferably formed from plastic material, including support 7, holder 6, indicator 5. The action and effect of spring 9, hinges 11, 12 and other necessary or desirable movability can be obtained by making proper use of the elastic properties of the material.

Fig. 2 is a section along the line marked X—X of Fig. 1. It shows the lower flange of reel 3, the core 2, the layer of tape *nd* and the guide-part 10 which is concentric to the core 2, but smaller and provided with a groove on its circumference in which the holder 6 glides. Friction between holder 6 and guide part 10 can, by known means, be made negligible. However if desired the holder 6 can be retracted from the guide part 10 during actual recording or replaying whenever accurate indexing is not required and may be arrested in retracted state. Released, the holder 6 will immediately resume its correct position in the groove of guide-part 10 and thus reinstate the accurate validity of the index-marks on the movable indicator.

So far the invention has been described in connection with subjective observation of the coincidenec of the changing length *nd* with appropriate index-marks. This is the cheapest and in many cases best suited realization of the invention.

I claim:

1. In a magnetic tape device a mechanism for continuously indexing the radial thickness of magnetic tape turns wound on the core of a reel, comprising a cylindrical guide-part with a peripheral outer surface mounted on said reel core concentrically to its axis, a movable lever pivotally mounted on a fixed point of said device, a spring pressing the free part of said lever to said peripheral outer surface of said guide-part, an indicator table lying perpendicularly to said reel core axis and being fastened on said lever, and a scale provided on said table, said scale indicating the radius of the helix formed by the wound-on turns of said magnetic tape and being radially arranged with respect to said tape turns.

2. In a magnetic tape device a mechanism according to claim 1, in which said indicating table is pivotally secured on said lever.

3. In a magnetic tape device a mechanism according to claim 1, in which the diameter of said cylindrical guide-part is nearly equal to the diameter of said reel core.

4. In a magnetic tape device a mechanism according to claim 1, in which a groove is arranged in said peripheral outer surface of said guide-part, and said free part of said lever is pressed into said groove.

References Cited in the file of this patent

UNITED STATES PATENTS

| | | |
|---|---|---|
| 917,444 | James | Apr. 6, 1909 |
| 1,300,257 | Felland | Apr. 15, 1919 |
| 1,535,520 | Cvitkovich | Apr. 28, 1925 |
| 1,564,964 | Knieling | Dec. 8, 1925 |
| 1,593,753 | Darlington | July 27, 1926 |
| 1,685,904 | Burke | Oct. 2, 1928 |
| 1,946,924 | Allen et al. | Feb. 13, 1934 |
| 1,985,228 | Borroughs | Dec. 25, 1934 |
| 2,713,209 | Brown | July 19, 1955 |
| 2,802,290 | Carey | Aug. 13, 1957 |
| 2,912,763 | Loewe et al. | Nov. 17, 1959 |